United States Patent [19]

Billey

[11] 3,936,251

[45] Feb. 3, 1976

[54] PRESS, NOTABLY FOR VULCANIZING TIRES

[75] Inventor: Michel Billey, Montlucon, France

[73] Assignee: Etablissements Zelant, Gazuit, Montlucon, France

[22] Filed: Mar. 11, 1975

[21] Appl. No.: 557,308

[30] Foreign Application Priority Data
Apr. 4, 1974 France .............................. 74.11967

[52] U.S. Cl. ................................... 425/38; 425/33
[51] Int. Cl.[2] ............................................ B29H 5/02
[58] Field of Search ......... 425/28 R, 38, 29, 31, 32, 425/33

[56] References Cited
UNITED STATES PATENTS

| | | | |
|---|---|---|---|
| 3,167,810 | 2/1965 | Soderquist | 425/32 |
| 3,222,716 | 12/1965 | Harris | 425/31 |
| 3,229,329 | 1/1966 | Heston et al. | 425/33 |
| 3,522,626 | 8/1970 | Balle | 425/38 |
| 3,564,649 | 2/1971 | Sodersquist | 425/29 |
| 3,640,653 | 2/1972 | Laenen et al. | 425/38 X |

Primary Examiner—J. Howard Flint, Jr.
Attorney, Agent, or Firm—Amster & Rothstein

[57] ABSTRACT

This press comprises a frame structure, an unloading station on one side of said frame structure, a mold, a cross member extending over said frame structure and movable in relation thereto between a molding position in which the upper portion of the mold is vertically aligned with the lower portion of the mold, and an unloading position in which said upper mold portion is vertically aligned with said unloading station. The cross member is mounted in cantilever fashion at one end to a support having a vertical axis and is adapted to pivot about this vertical axis and slide along said support. The press is intended notably for vulcanizing tires and affords a considerable reduction in the mold loading and unloading time while being more reliable in operation.

14 Claims, 5 Drawing Figures

PRESS, NOTABLY FOR VULCANIZING TIRES

BACKGROUND OF THE INVENTION

1. Field of the Invention

This invention relates in general to presses, notably for vulcanizing tires, of the type comprising a frame structure, an unloading station located on one side of said structure; a mold having a lower portion supported by said structure and an upper portion, a cross member from which said upper mould portion is suspended, said cross member extending over said frame structure and being movable in relation thereto between a moulding position in which said upper mold portion is vertically aligned with the lower mold portion and an unloading position in which said upper mold portion is vertically aligned with the unloading station.

2. Description of the prior art

Most modern vulcanizing presses are equipped with means for automatically loading the crude tyre to be vulcanized, the cured tyre being subsequently unloaded by means of a roller conveyor.

As a rule, the vulcanization cycle takes place automatically and the major fraction of the cycle time is devolved to the tyre curing process, and the mould opening time, crude time, crude tyre loading time, cured-tyre unloading time and mould re-closing time constitute but a small fraction of the total cycle time (about eight percent under the most propitious circumstances). Since the operator entrusted with the vulcanization operation must also suply crude tyres to several presses, there is provided in front of each vulcanization cavity (as a rule two such cavities are provided in each press) a stocking cradle adapted to receive a crude tyre substantially at any time during the vulcanization cycle. Thus the operator is alllowed a certain flexiblity as far as the loadinng time is concerned, a feature not obtainable if the tyre were to be mounted directly on the loader. With this system, one tyre is undergoing the vulcanization step while another tyre is waiting on the loader and a third tyre is placed on the stocking cradle by the operator.

On the other hand, a cured tyre is unloaded either before or while loading a crude tyre, according to the press design. Thus, in a first type of known press in which the cured tyre is discharged before starting the fitting of the crude tyre into the lower mould portion, there is provided, for loading crude tyres to be vulcanized, a loader supported by a hanger pivoted to the frame structure of the press and adapted, with the assistance of a hydraulic or pneumatic cylinder and piston actuator and clamps (internal or external clamps, according as the tyre is a conventional one or a radial-ply one), to pick up the crude tyre to be vulcanized from the stocking cradle, hold this tyre waiting during the vulcanization and unloading of the tyre being vulcanized, then position the crude tyre to be vulcanized in vertical alignment with the lower mould portion before releasing said tyre and moving back to pick up another crude tyre from the stocking cradle. The known presses of this first type further comprise, for unloading the cured tyres, at least one roller discharge conveyor adapted to be moved and positioned by suitable means under the cured tyre previously lifted with the upper portion of the mould up to a predetermined level above the lower mould portion, and arranged with a view to allow the cured tyre to slide down to another conveyor constituting a general cured-type collecting system for a series of presses.

In a second known type of presses of the kind currently referred to as "slide back" presses, wherein the loading operation and the unloading operation take place simultaneously, the tyre loader is connected with the press closing cross member and this member has two degrees of liberty. In other words, the cross member can move along a vertical path and along a horizontal path. With this arrangement, while the mould is closed and a tyre is undergoing the vulcanization process, the loader can pick up a crude tyre automatically from the stocking cradle and hold it waiting. At the end of the vulcanization step, the press is opened and the cross member is caused to move horizontally or substantially horizontally with the upper portion of the mould, and also with the cured tyre, to a position located above a roller conveyor where the cured tyre is released. During this horizontal or substantially horizontal movement of the cross member, the loader connected with said cross member is moved to a position in which it is in vertical alignment with the press cavity (i.e., the lower portion of the mould) so that a crude tyre can be positioned in turn into this mould portion.

Hitherto known presses of the two above-described types however have various inconveniences. Thus, notably, in the first case there is a likelihood of not properly removing or clearing out the discharge conveyor during the mould closing step, for example in cae of electric or pneumatic failure in the means controlling the movement of said discharge conveyor; it is obvious that in this case very serious damages would result. Moreover, the loading and unloading times are considerably longer since these two operations take place in succession.

In the second case, the loading time and unloading time are shorter than in the first case, but still relatively long due to the considerable inertia developing in the press. Moreover, owing to the specific design of the assembly, a constant vertical movement of the cross member is necessary, whatever the vertical dimension of the mould, and this also causes a loss of time when the press is operated for vulcanizing relatively small tyres.

SUMMARY OF THE INVENTION

It is therefore the main object of the present invention to provide a press for vulcanizing tyres which provides the advantageous features of simultaneous loading and unloading, but without the inconveniences characterizing known presses of said first and second types.

More particularly, the present invention is directed to provide a press which is particularly reliable in operation and capable of reducing considerably the loading and unloading times.

To this end, the invention provides a press of the type referred to above, characterized in that the cross member is mounted at one end in cantilever fashion to a support having a vertical axis, and so arranged that it can both pivot about the vertical axis of said support and slide therealong.

According to another feature characterizing this invention, the loader is connected to said cross member for movement therewith in such a manner that, when said cross member is in it moulding position, said loader is vertically aligned with the loading station, and that, when said cross member is in its unloading position, said loader is vertically aligned with the lower portion of the mould so as to load same, in a manner somewhat similar to that observed in known presses of the second type mentioned hereinabove.

BRIEF DESCRIPTION OF THE DRAWINGS

Other objects, features and advantages of this invention will appear as the following detailed description thereof proceeds with reference to the attached drawings, in which.

DESCRIPTION OF THE PREFERRED EMBODIMENTS

Figure 1:
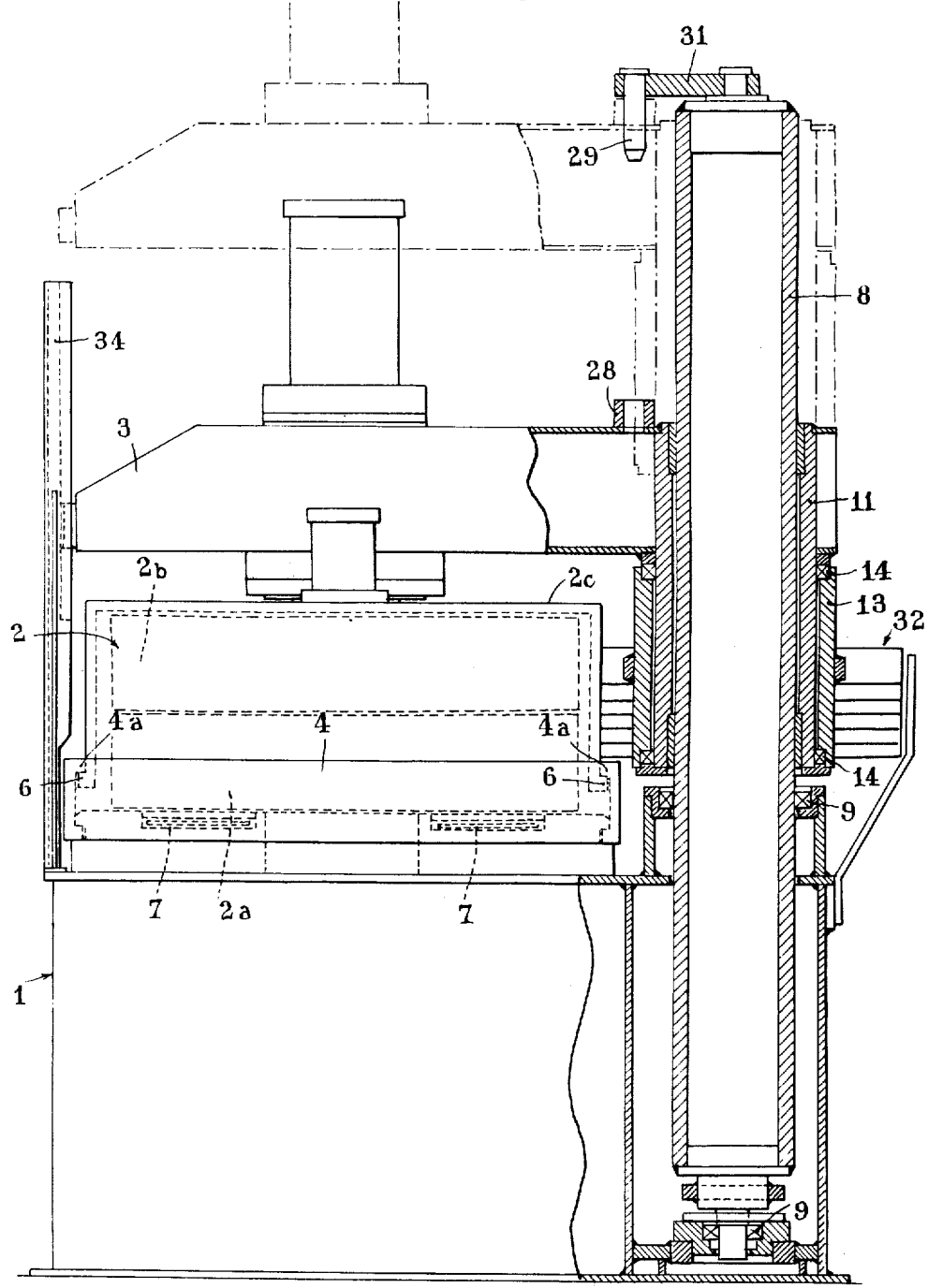
FIG. 1 is an elevational view, with parts shown in vertical section, of a press according to a first embodiment of this invention.
Figure 2:
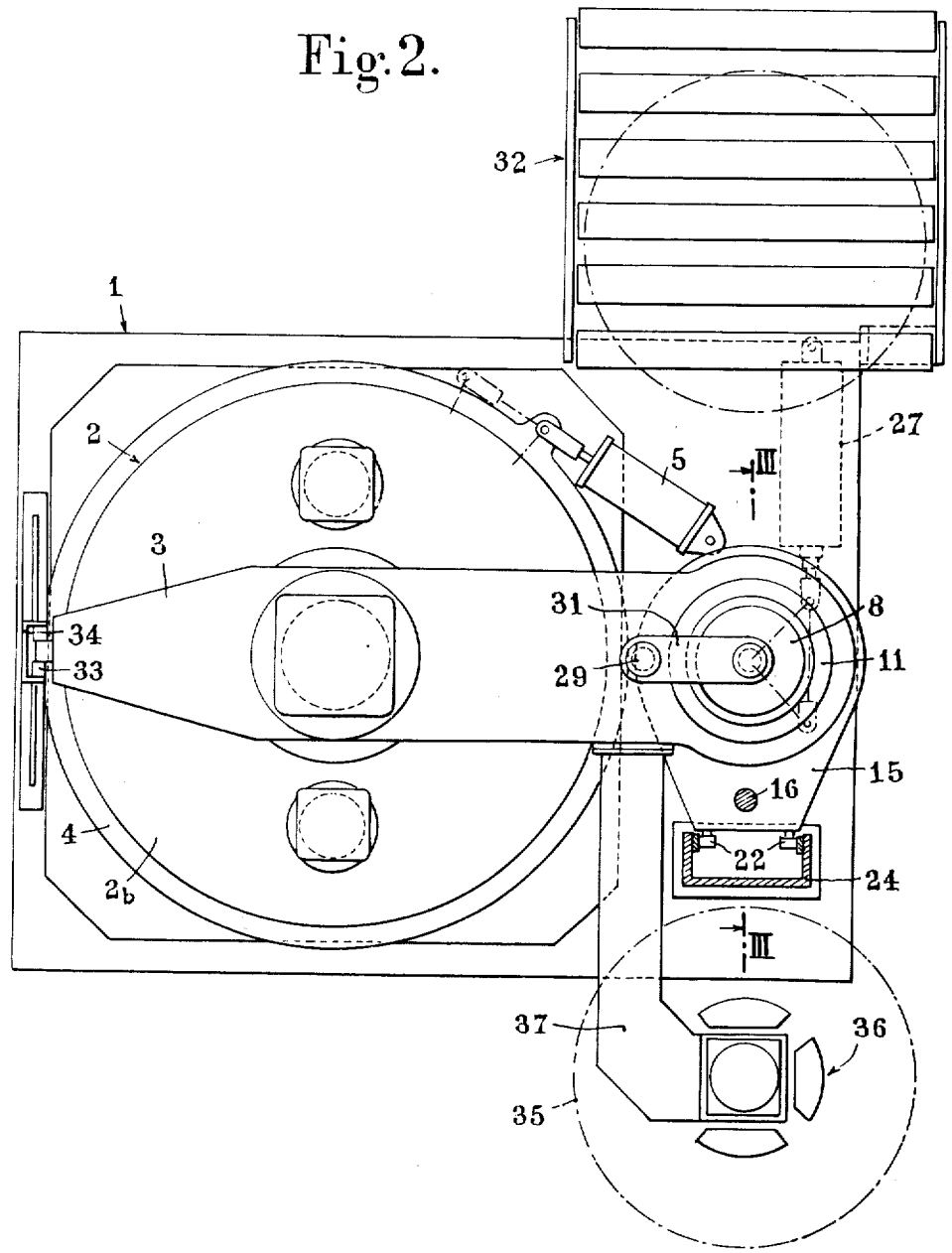
FIG. 2 is a top plan view of the press shown in FIG. 1.

The press illustrated diagrammatically in FIGS. 1 and 2 of the drawings comprises a frame structure 1 and an interchangeable mould 2 consisting in a manner known per se of a lower portion 2a detachably mouted to, and supported by, said frame structure 1, and of an upper portion 2b detachably mounted in a substantially bell-shaped support 2c suspended in turn from a cross member 3 extending over the frame structure 1 and movable in relation thereto. The mould proper may be of the shell type or of the segment type, according as it is intended for curing conventional tyres or radial ply tyres. These two types of moulds and the various control means associated therewith, for example for operating the mould segments and for positioning and centering the uppor bead of the tyre, which means are also supported by said cross member 3 or said bell-shaped support 2c, are well known in the art and therefore do not need a detailed description herein, inasmuch as they are not necessary for a complete understanding of the present invention.

In a manner known per se a bayonet-type locking device is provided for locking the bell-shaped support 2c in relation to the frame structure 1. This locking device comprises a ring 4 of substantially cylindrical configuration, rotatably mounted to said frame structure 1 but held against vertical movement in relation thereto, and drive means, for example in the form of a doubleacting cylinder and piston actuator 5 pivoted at one end to the frame structure 1 and at the opposite end to said ring 4 for rotating this ring 4 about its vertical axis which is also the axis of the lower portion 2a of mould 2. As shown more in detail in FIG. 1, this ring 4 has formed at spaced intervals along its upper edge internal projections 4a which are adapted, when the ring 4 is rotated in one direction, to register with underlying projections 6 formed at spaced intervals on the outer surface, and along the lower edge of, the bell-shaped support 2c so as to lock said bell-shaped support in relation to the frame structure 1 or, when said ring 4 is rotated in the opposite direction, to disengage said projections 6 in order to release the bell-shaped support 2c from the frame structure 1 and to permit the opening of the mould by lifting its upper portion.

In the locked condition of the lower and upper mould portions the necessary sealing pressure may be provided also in a manner known per se by either inflating an annular bladder 7 or actuating pneumatic or hydraulic cylinder and piston units. The ring 4 is designed with a view to withstand the sealing pressure transmitted to the upper portion of the mould, so that this pressure is not applied to the cross member 3 and therefore the latter can be constructed in a considerably lighter fashion. This cross member 3 may thus assume the shape of a relatively light box-sectioned beam having a relatively low inertia.

According to a typical feature characterizing this invention, the cross members consists of a cantilever beam having one end rigidly mounted to a support consisting of a vertical upright, and this beam is adapted both to pivot about the vertical axis of said upright and to slide therealong. As illustrated more in detail in FIGS. 1 and 3, said support, according to a first embodiment of the present invention, may consist of a vertical cylindrical tubular post or upright 8 rotatably mounted in the frame structure 1 by means of a pair of bottom and intermediate bearings 9. Thus, said cross member 3 is rigidly secured at one end, for example by welding, to a cylindrical sleeve 11 slidably mounted on said tubular post or upright 8.

Figure 3:
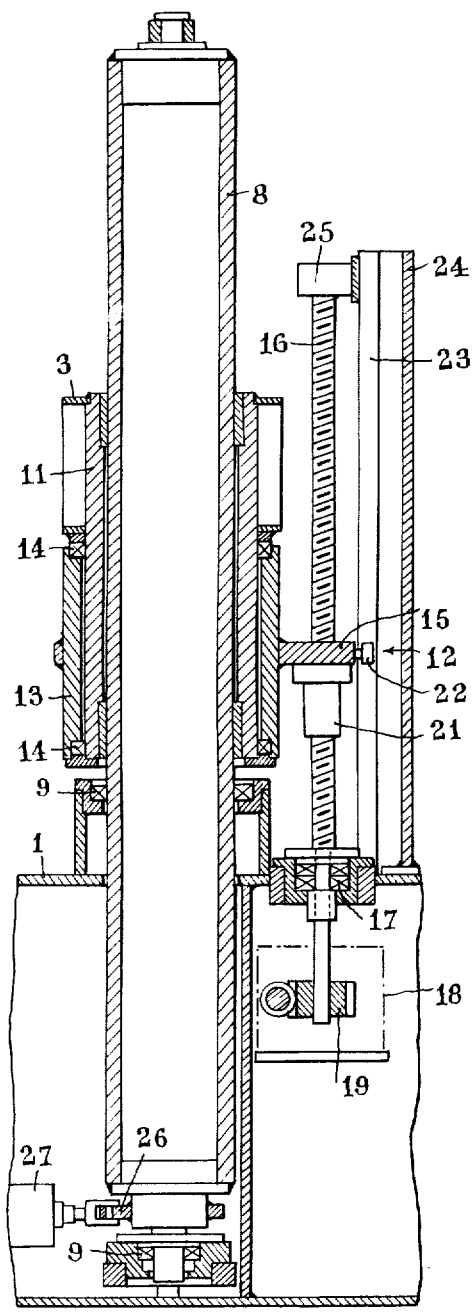
FIG. 3 is a fragmentary section taken along the line III—III of FIG. 2.

Elevator means 12 are provided for positively driving up- and downwards the sleeve 11 along the post 8 and thus move the cross member 3 to the desired vertical position. As shown in FIG. 3, these elevator means 12 may comprise another cylindrical sleeve 13 rotatably mounted on an downward extension of the first cylindrical sleeve 11 by means of a pair of bearings 14 also acting as axial thrust bearings, a radial arm 15 rigidly secured, for example by welding, to said cylindrical sleeve 13, and driving means operatively connected to said arm 15 and adapted to move same vertically. The arm driving means may consist for instance of a ball screw 16 extending vertically adjacent to the cylindrical post 8. Said ball screw 16 has its lower end rotatally mounted by means of a bearing 17 in the frame structure 1, and it is rotatably driven from a power and reduction unit 18 mounted in the frame structure and adapted to drive a pinion 19 rigidly fastened to a lower extension of said ball screw 16. When driven for rotation this ball screw causes the translation of a ball nut 21 engages thereon and rigidly connected to said arm 15. At its free end the arm 15 carries a pair of rollers 22 adapted to roll along a pair of vertical races 23 formed on the inner surfaces of the lateral wings of a vertically extending channel member 24 (see notably FIG. 2) so as to provide an accurate guiding of said arm 15. At its upper end, the member 24 carries a bearing 25 in which the ball screw 16 is journalled.

Furthermore, drive means are provided for pivoting the cross member 3 about the vertical axis of the support, i.e. the tubular post 8. As shown more particularly in FIGS. 2 and 3, these drive means may comprise for example a crank arm 26 rigidly secured to said cylindrical post 8, power means, for example in the form of a hydraulic or pneumatic double acting cylinder and piston actuator 27 operatively connected to the crank arm 26, and a pair of complementary coupling means adapted, when said cross member 3 is in its uppermost position, to transmit to said cross member the movement of rotation impressed by the actuator 27 via said crank arm 26 to said cylindrical post 8. As illustrated more particularly in FIG. 1, these complementary means may comprise for instance a socket 28 carried by said cross member, and a top stud 29 carried by a radial arm 31 secured to the upper end of the cylindrical post 8, said stud 29 being engageable by said socket 28 when the cross member 3 is raised to its uppermost position by the above-described elevator means.

With this arangement, when the cross member 3 and the upper portion of the mould are lifted by said elevator means, the socket 28 engages the stud 29 so that the actuator 27 can be operated to pivot the assembly comprising said cross member and said upper mould portion through a predetermined angle about the axis of the cylindrical post 8 and thus bring the upper portion of the mould in vertical alignment with the unloading station or vice versa, i.e., from this position to the actual moulding position illustrated in FIGS. 1 and 2. The unloading station may consist in a manner known per se of a small roller conveyor 32 disposed on one side of the press and leading to another, larger conveyor acting for example as a main or general collector for a series of presses. In the moulding position of the assembly comprising the cross member and the upper mould portion a roller 33 mounted for loose rotation to the free end of cross member 3 is guided between the side wings of a vertical channel-shaped guide member 34 secured at its lower end to the frame structure 1. When the cross member 3 is moved from its upper position to its lower position for moulding a tyre (FIG. 1), the roller 33 engages at the end of this stroke said channel-shaped guide member 34 and thus the upper portion of the mould is properly centred in relation to the lower portion of the mould.

In addition, this press comprises a loading station located at the opposite side of the frame structure in relation to the unloading station. This loading station may consist for example of a stocking cradle for receiving a crude tyre 35 to be vulcanized, and a loader 36 connected to said cross member 3 and adapted to pick up the crude tyre 35 from said stocking cradle and transfer same to the upper portion of the mould and deposit the crude tyre into this mould portion. The loader 36, which may be for example of the type disclosed in the U.S. Pat. No. 3,809,423 is secured to the free end of a horizontal arm 37 having its opposite end connected to said cross member 3. The dimensions and shape of this horizontal arm 37 are such that the loader and the upper portion of the mould have their vertical axes equally spaced from the vertical axis of the tubular post 8 and located in respective vertical planes containing the vertical axis of said post 8, said planes forming between them an angle equal to the above-mentioned predetermined angle, i.e. 90° in FIG. 2. Thus, when the cross member 3 is in the moulding position illustrated in FIG. 2, the loader 36 is in vertical alignment with the loading station and, after a rotation of 90°, when the cross member 3 has been brought above the unloading station 32, said loader 36 is exactly in vertical alignment with the lower portion of the mould 2, so that the loading and unloading operation can take place simultaneously.

Figure 4:
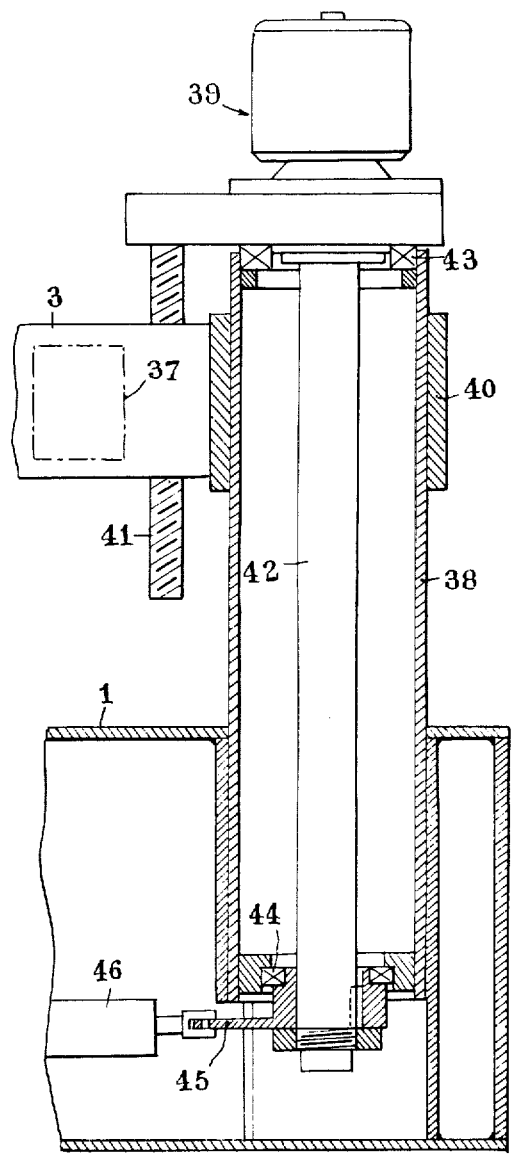
FIG. 4 is a fragmentary view similar to FIG. 1 showing a modified embodiment of this invention.

FIG. 4 illustrates a modified embodiment of the present invention wherein the cross member 3 is secured to a sleeve 40 mounted for rotation and axial sliding movement on a vertical hollow cylindrical post 38 rigidly secured to the frame structure 1. In this case, the elevator means comprise power means 39, for example in the form of a motor and reduction gearing unit supported by the upper end of post 38, and a ball screw 41 rotatably driven from said unit 39 and engaging internal threads formed in or equivalent means carried by, the cross member 3, for controlling the vertical movements of said cross member 3.

With this modified arrangement, the means for pivoting the cross member 3 about the vertical axis of post 38 may comprise a vertical shaft 42 mounted for coaxial rotation within the hollow post 38 by means of bearings 43 and 44, a crank arm 45 similar to the crank arm 26 of the preceding embodiment, which is rigidly secured to the lower end of shaft 42, and power means such as a double acting cylinder and piston unit 46 similar to the actuator 27 of the preceding embodiment, which is connected to the crank arm, 45 so as to cause the vertical shaft 42 to rotate about its vertical axis. Moreover, the power and reduction gearing unit 39 is rigidly secured to the upper end of shaft 42 in order to transmit through the ball screw 41 the movement of rotation from said shaft 42 to cross member 3.

In contrast to the arrangement illustrated in FIGS. 1 to 3, in which it was necessary to wait until the cross member 3 reached substantially its uppermost position and the socket 28 was engaged on stud 29 before the cross member 3 could be pivoted about the vertical axis of tubular post 8, the modified structure proposed in FIG. 4 is advantageous in that the cross member 3 can be pivoted about the axis of the cylindrical post 38 and shaft 42 as soon as the cross member 3 has been lifted to an extent sufficient to enable the upper portion of the mould to clear the lower portion thereof, so that the time necessary for performing the loading and unloading operations can be reduced considerably.

Figure 5:
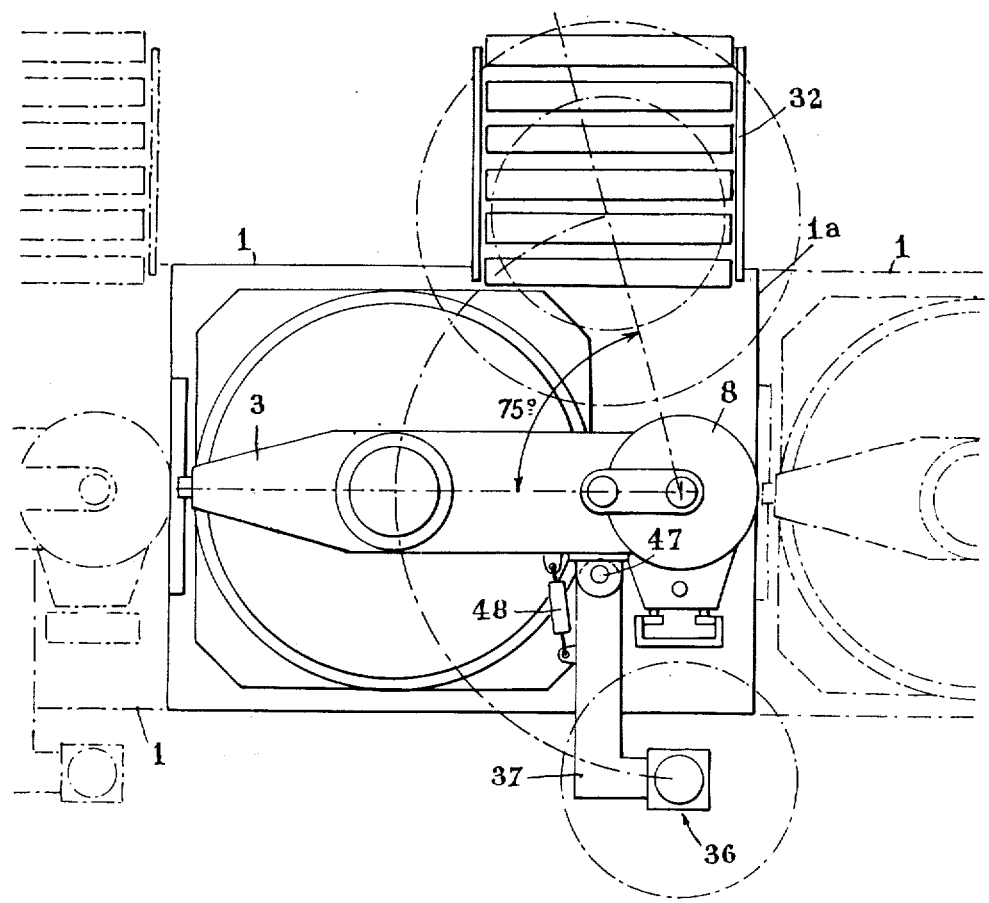
FIG. 5 is a top plan view showing another possible embodiment of the present invention.

FIG. 5 illustrates another modified embodiment of the invention in which the predetermined angle of pivotal movement of cross member 3 about the vertical axis of the cylindrical hollow post 8 from the moulding position to the unloading position is about 75°. In this case, the roller conveyor 32 must be slightly off-set to the left in relation to the postion illustrated in FIG. 2. This arrangement is advantageous in that said roller conveyor 32 does not project beyond the right-hand side 1a of the press, and that the upper portion of the mould does not project or projects only slightly beyond this side 1a of the press frame structure when the cross member is in its unloading position, so that it is possible to join or disposed the frame structures 1 of several presses side by side without any loss of floor space, as evidence by the top plan view of FIG. 5.

However, if the embodiment shown in this FIG. 5, the arm 37 supporting the loader 36 has the same dimensions and shape as the arm described with reference to the embodiment of FIGS. 1 to 3 of the drawings, some arrangements must be made to cause the loader 36 to describe a circular arc of 90° while the cross member privots through an angle of only 75°. This can be obtained, as illustrated in FIG. 5, by providing a pivot shaft 47 for mounting the arm 37 on cross member 3, and also by providing a cylinder and piston actuator 48 connected at one end to the cross member 3 and the opposite end to the arm 37, this actuator being monitored to cause the loader 36 to move through a 90° arc while the cross member pivots through an angle of about 75°.

On the other hand, through the modified construction shown in FIG. 5 utilizes the same elevator means as those incorporated in the structure of FIGS. 1 to 3, and also the same means for pivoting the cross member about the vertical axis of cylindrical post 8, it is clear that the means described hereinabove with reference to FIG. 4 could be substituted for said same means.

Besides, it will be readily understood by those conversant with the art that the various embodiments described hereinabove with reference to the attached drawings are given by way of example, not of limitation, and that many modifications and changes may be brought thereto without departing from the basic principles of the invention as set forth in the appended claims.

What is claimed as new is:

1. a press for vulcanizing tires, which comprises a frame structure, an unloading station located on one side of said frame structure, a mold comprising a lower portion supported by said frame structure and an upper portion, a cross member from which said upper mold portion is suspended, said cross member extending over said frame structure and being movable in relation thereto between a molding position in which said upper mold portion is vertically aligned with said lower mold portion and an unloading position in which said upper mold portion is vertically aligned with said unloading station, wherein said cross member is mounted at one end in overhanging relationship to a support having a vertical axis, said cross member being so arranged that it can both pivot about the vertical axis of said support and slide therealong.

2. A press as set forth in claim 1, which further comprises elevator means operatively connected to said cross member for causing same to slide along said vertical axis of said support.

3. A press as set forth in claim 2, wherein first drive means are provided and arranged for pivoting said cross member about said vertical axis of said support.

4. A press as set forth in claim 3, wherein said support consists of a vertical cylindrical post rotatably mounted in said frame structure, said cross member being rigidly secured to a cylindrical sleeve slidably mounted on said cylindrical post.

5. A press as set forth in claim 4, wherein said elevator means comprise a second cylindrical sleeve rotatably mounted, but held against axial movement in relation to said first cylindrical sleeve, a radial arm rigidly secured to said second sleeve and second drive means operatively connected to said radial arm and adapted to move same vertically.

6. A press as set forth in claim 5, wherein said second drive means comprise a ball screw extending vertically and laterally to said cylindrical post and rotatably mounted in relation to said frame structure, first power means being provided for rotating said ball screw in either direction, and a nut engaging said ball screw and rigidly secured to said radial arm so as to move same vertically.

7. A press as set forth in claim 4, wherein said first drive means comprise a crank arm rigidly secured to said cylindrical post, second power means connected to said crank arm, and a pair of complementary coupling means carried by said cross member and said cylindrical post, respectively, at the upper end of said post, and engageable one in the other when said cross member is brought to its uppermost position by said elevator means, and thereby allowing the transmission of the rotational movement from said cylindrical post to said cross member.

8. A press as set forth in claim 3, wherein said support consists of a hollow vertical cylindrical post rigidly secured to said frame structure, said cross member being rigidly secured to a cylindrical sleeve adapted both to slide axially and rotate on said cylindrical post.

9. Press as set forth in claim 8, wherein said elevator means comprise first power means supported by the upper end of said cylindrical post and a ball screw rotatably driven from said first power means and operatively connected to said cross member in order to control the vertical movement thereof.

10. A press as set forth in claim 9, wherein said first drive means comprise a vertical shaft rotatably and coaxially mounted within siad cylindrical post, a crank arm rigidly secured to the lower end of said shaft and second power means operatively connected to said crank arms, said first power means being rigidly secured to the upper end of said shaft in order to transmit through said ball screw the rotational movement of said shaft to said cross member.

11. A press as set forth in claim 1, which further comprises a loading station and a loader connected to said cross member to move therewith, whereby, when said cross member is in the molding position, it is vertically aligned with the loading station, and when said cross member is in the unloading position, it is vertically aligned with the lower portion of the mold for loading same.

12. A press as set forth in claim 11, wherein said loader is secured to the free end of a horizontal arm having its opposite end connected to said cross member, the dimensions and shape of said arm being such that said loader and the upper portion of the mold have their vertical axes equally spaced from the vertical axis of the cross member support and in respective vertical planes containing the vertical axis of said support, said planes forming a predetermined angles with each other.

13. A press as set forth in claim 12, wherein said predetermined angle is equal to 90° and said loader station, the lower portion of said mold and said unloading station are disposed at a 90° relative angular spacing in said order along the circumference of a circle centred to said vertical support axis.

14. A press as set forth in claim 12, wherein said predetermined angle is equal to 90°, said loading station and the lower portion of said mold being spaced angularly by 90° from each other, the lower portion of said mold and said unloading station being spaced about 75° from each other along the circumberence of a circle centered to the vertical axis of said support, the arm supporting said loader at one end being pivoted at its opposite end to said cross member, a cylinder and piston actuator connected at one end to said cross member and at the opposite end to said arm being monitored to cause said loader to describe a 90° circular arc path during the 75° pivotal movement of said cross member.

* * * * *